March 14, 1944.  J. R. MORTLOCK ET AL  2,344,261

DIELECTRIC MONITOR SYSTEM

Filed June 27, 1942

Inventors:
Joseph R. Mortlock,
Kenneth J. R. Wilkinson,
Geoffrey W. Carter,
by Harry E. Dunham
Their Attorney.

Patented Mar. 14, 1944

2,344,261

UNITED STATES PATENT OFFICE 2,344,261

DIELECTRIC MONITOR SYSTEM

Joseph R. Mortlock, Kenton, and Kenneth J. R. Wilkinson and Geoffrey W. Carter, Rugby, England, assignors to General Electric Company, a corporation of New York Application June 27, 1942, Serial No. 448,860
In Great Britain August 11, 1941

3 Claims. (Cl. 175—294)

This invention relates to dielectric monitor systems more particularly to systems for indicating a reduction in the insulation value of dielectric interposed between a high potential electric conductor and the metal sheathing or cladding protecting the conductor. The invention is more especially intended to apply to metal-clad high voltage bus-bars.

Many systems of protection against faults on the bus-bars of metal-clad switchgear have hitherto been proposed. Many of them involve the use of extensive and complicated wiring, and the use of a plurality of relays, and are consequently relatively expensive to provide and instal. Furthermore they rely on the flow of appreciable fault current, resulting from the deterioration of the insulation, for their operation.

It is an object of the invention to provide a simple and inexpensive system for indicating the condition of the dielectric insulating a high voltage conductor from a surrounding metal sheath whereby to enable an impending fault on the conductor to be averted.

It is a further object to provide a system for automatically disconnecting a high tension busbar from its source of supply in the event that the insulation of the bus-bar deteriorates to a predetermined extent, thus providing adequate protection therefor.

It is a further object of the invention to provide a protective system for a polyphase bus-bar installation having sectionalized metal cladding and utilising a reactance bridge, in which arms of the bridge are formed by the capacitances which exist between the bus-bars and their metal cladding, as a means for determining the state of the dielectric insulating the bus-bars, and operating the protective gear in the event that the dielectric deteriorates to a predetermined degree.

Figure 1:
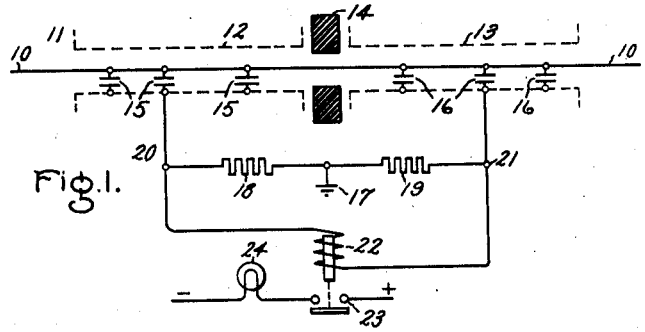
Figure 2:
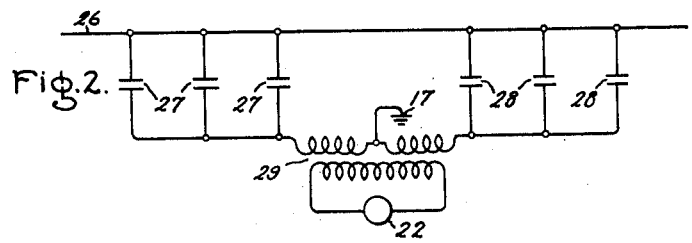
Figure 3:
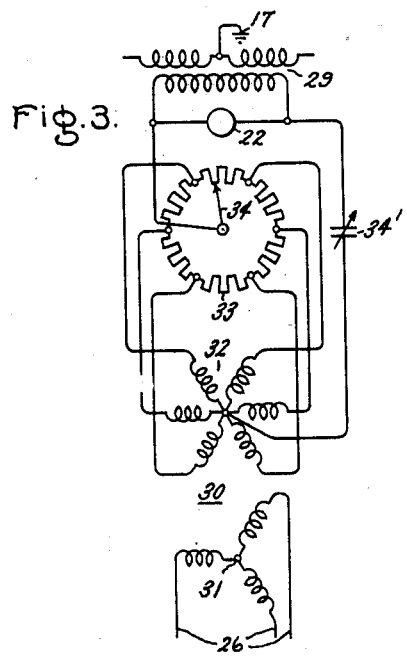
Figure 4:
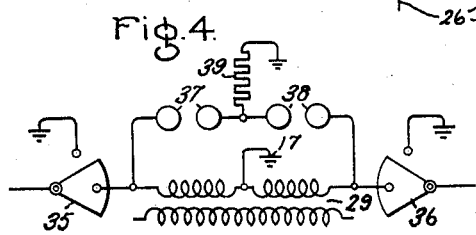

For a better understanding of our invention together with further objects and advantages thereof reference will now be directed to the following description of the accompanying drawing, in which Fig. 1 is a diagram showing a simple form of the invention as applied to single-phase systems; Fig. 2 is a modification of the arrangement shown in Fig. 1 and applicable to polyphase systems; Fig. 3 is a modification of the arrangement shown in Fig. 2 in which provision is made for initial balancing of the bridge circuit; and Fig. 4 shows a further detail modification.

Referring firstly to Fig. 1, we have indicated at 10 a high voltage electric conductor which may form part of the bus-bar system of a metal-clad gear. The conductor 10 is encased in a metal sheath 11, the sheath being insulated from the conductor by air or other suitable insulation. The sheath 11 is shown as being sectionalized, adjacent sections 12, 13 being indicated. These sections are insulated from one another by insulation indicated diagrammatically at 14. The capacitance existing between the sheath and the conductor is indicated by the condensers 15, 16. The metal sheath 11 is suitably insulated from earth. The two sections of the sheath are connected to earth at 17 through impedances shown as resistors 18, 19 respectively. The capacitance represented by condensers 15, 16 respectively, together with the impedances 18, 19 are so adjusted that together they form, under normal conditions of operation, a balanced bridge circuit, the diagonally opposite points 20, 21 of which are at the same potential. Across the points 20, 21 is now connected a voltage responsive device, indicated as a relay 22.

Under normal conditions no current will flow through the device 22, but in the event of a change in the insulating value of the dielectric separating the conductor 10 from the sheath 11 in either one or other of the sections thereof, the balance of the bridge will be upset and a current will flow through the device 22 causing it to operate. Such operation may be caused by closure of normally open contacts 23 to light an indicating lamp 24, thereby giving an indication of the deterioration in the insulating value of the dielectric which may lead to a breakdown of the same. Suitable precautions may then be taken by the operator to avoid any damage to the gear as a result of the deterioration of the insulation. The device 22 may act as a protective relay to operate a circuit breaker or breakers to cut out sections of bus-bar to enable them to be properly inspected as to the damage present.

In the arrangement shown in Fig. 2, as applied to polyphase gear, the metal sheath around the three-phase conductors 26 has been omitted from the drawing, and the capacitance between the phase-conductors and the adjacent sections of the metal sheathing has been indicated by condensers 27, 28 respectively. In this arrangement the metal sheaths, represented by the lower plates of condensers 27 and 28 respectively for the two adjacent sections, are connected together and to earth at 17 through the opposite halves of the primary winding of a transformer 29, the secondary winding of which is connected to the indicating device or relay 22, equivalent to the device indicated in Fig. 1 by the same reference numeral. Assuming that the capacitances 27 and 28 are equal, under normal conditions there will be no resultant current flow through the device 22, but upon deterioration of the insulation of any one of condensers 27, 28, the balance will be upset and a current will flow through the device 22 which may be utilised as indicated in the arrangement shown in Fig. 1.

Since under normal conditions, the individual capacitances represented by condensers 27, 28 will not be equal, it is desirable to provide means for balancing out any residual current which may flow in the secondary winding of transformer 29. This may be effected by the arrangement shown in Fig. 3. In this arrangement, an auxiliary polyphase transformer 30 is provided, the primary windings 31 of which are connected to the 3-phase supply to the conductors 26, and the star secondary winding 32 of which has its outer terminals connected to equi-distant points of a toroidally wound resistor 33. The moving contact arm 34 of the resistor is connected to the one terminal of the secondary winding of transformer 29, while the star point of the secondary winding 32 is connected through a condenser 34' to the other terminal of the secondary winding of transformer 29. On adjusting the position of contact arm 34, it is possible to provide a neutralising current of the required phase to balance out any residual current due to a difference in the capacitance of one of condensers 27, 28 respectively, from the others, while by adjustment of the condenser 34' it is possible to obtain the required magnitude of such neutralising current.

In Fig. 4 we have shown an arrangement in which it is possible to determine which of the insulators represented by condensers 27, 28 is at fault. In this arrangement, a make-before-break switch 35 is inserted in the connection between the lower terminals of the condensers 27 and the left-hand terminal of the primary winding of transformer 29, and a similar switch 36 is inserted at the other terminal connection. By means of switches 35, 36, the sets of condensers 27, 28 can be isolated in turn and by adjustment of the movable contact 34 of resistor 33 and of condenser 34', in Fig. 3 the faulty insulator can be determined. Preferably, in order to allow for the condition of a complete failure of one of the capacitors 27 or 28, the half-sections of the primary winding of condenser 29 are paralleled by air gaps, 37, 38, the adjacent connections of which are connected to earth through resistor 39. The resistor 39 ensures sufficient voltage being available to enable the detector 22 to operate under all conditions.

It will be apparent to those skilled in the art that our invention is not limited to the particular arrangements illustrated but that changes and modifications may be made without departing from the spirit and scope of our invention as set forth in the appended claims.

What we claim as new and desire to secure by Letters Patent of the United States is:

1. An electric protective arrangement for a high voltage electric conductor, having a sectionalized metal sheath encasing said conductor and insulated therefrom by dielectric means, an impedance connected between one section of said sheath and earth, a second impedance connected between another of said sections and earth, whereby said impedances and the capacitances existing between said sections and said conductor form a balanced bridge circuit under normal conditions of the dielectric means separating said sections from said conductor, means connected between said sections and responsive to a change in voltage between the balance points of said bridge circuit to indicate a deterioration in the insulation value of said dielectric means separating one of said sections from said conductor, and means for determining, when the protective means has responded, which of the capacitances formed by said conductor and said sections of said sheath insulated therefrom has deteriorated comprising switching means for selectively isolating the capacitances whereby the faulty dielectric may be ascertained.

2. A protective arrangement for polyphase sectionalized metal-clad bus-bars comprising means for interconnecting the metal sheaths covering the phase conductors of one section of said bus-bars, means for interconnecting the metal sheaths covering the phase conductors of another section of said bus-bars, a center-tapped primary transformer winding having its center tap connected to earth, connections between each end of said winding and one of said interconnecting means, a secondary winding inductively related to said primary winding, means for injecting into said secondary winding a voltage such that residual current induced in said secondary winding from said primary winding under normal conditions of the dielectric separating said bus-bars from said metal sheaths is neutralized and means connected across said secondary winding to respond to a voltage appearing across said winding as a result of the deterioration of said dielectric.

3. A protective arrangement for polyphase sectionalized metal-clad bus-bars comprising means for interconnecting the metal sheaths covering the phase conductors of one section of said bus-bars, means for interconnecting the metal sheaths covering the phase conductors of another section of said bus-bars, a center-tapped primary transformer winding having its center tap connected to earth, connections between each end of said winding and one of said interconnecting means, a secondary winding inductively related to said primary winding, means for injecting into said secondary winding a voltage such that residual current induced in said secondary winding from said primary winding under normal conditions of the dielectric separating said bus-bars from said metal sheaths is neutralized, means connected across said secondary winding to respond to a voltage appearing across said winding as a result of the deterioration of said dielectric, and means for determining, when the protective means has responded, which of the capacitances formed by the conductors and the sections of sheath insulated therefrom has deteriorated comprising switching means inserted in the connection between the capacitances and the primary winding whereby to enable the capacitances to be selectively isolated and the faulty dielectric to be ascertained.

JOSEPH R. MORTLOCK.
KENNETH H. J. R. WILKINSON.
GEOFFREY W. CARTER.